W. E. FOWLER, Jr.
CAR BRAKE HEAD.
APPLICATION FILED SEPT. 29, 1908.
920,945.
Patented May 11, 1909.
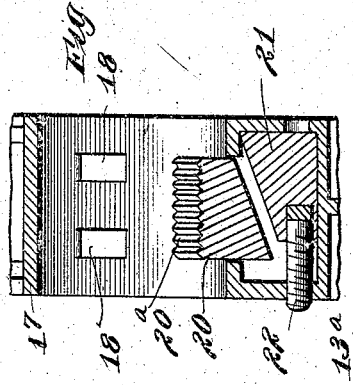
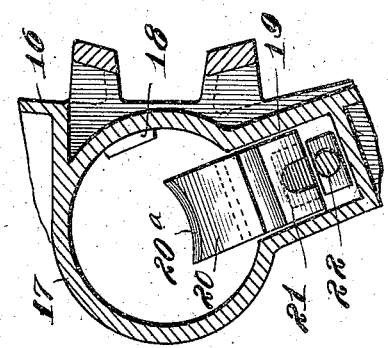
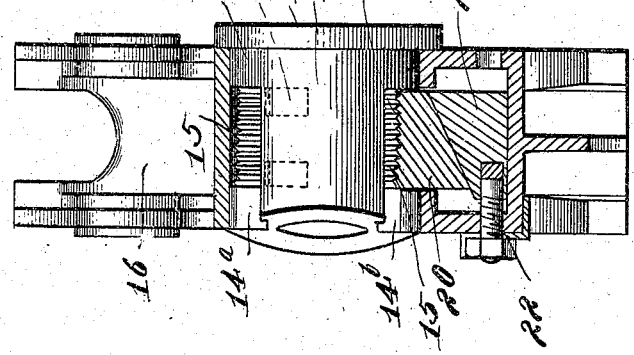
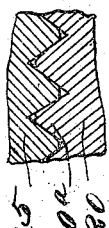
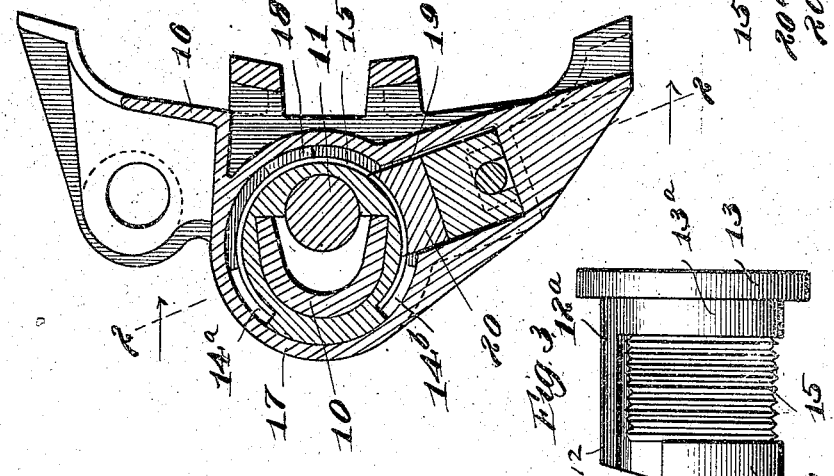
Witnesses:
G. A. Taubenschmidt
Walter M. Fuller
Inventor:
William E. Fowler Jr.
By Offield Towle & Linthicum
Attys.

UNITED STATES PATENT OFFICE.

WILLIAM E. FOWLER, JR., OF HAMMOND, INDIANA, ASSIGNOR TO SIMPLEX RAILWAY APPLIANCE COMPANY, OF CHICAGO, ILLINOIS, A CORPORATION OF ILLINOIS.

CAR BRAKE-HEAD.

No. 920,945.

Specification of Letters Patent.

Patented May 11, 1909.

Application filed September 29, 1908. Serial No. 455,277.

*To all whom it may concern:*

Be it known that I, WILLIAM E. FOWLER, Jr., a citizen of the United States, residing in Hammond, Indiana, have invented certain new and useful Improvements in Car Brake-Heads, of which the following is a specification.

My invention relates to that class of brake heads which are adjusted axially about the brake beam and are provided with means for securing them in any fixed position of adjustment.

Various constructions of adjustable brake heads have been made and used, in some of which the brake head is rigidly and unyieldingly locked in the fixed position. When so locked the breakage is likely to occur by reason of the fact that when the car is heavily loaded it descends slightly, compressing the carrying springs, and the brake heads are correspondingly lowered. Furthermore, it sometimes occurs, owing to careless adjustment, that the brake-heads, when rigidly fixed, do not occupy the proper positions with reference to the tread of the wheels and undue strain is brought to bear upon one point of the brake head which is in contact with the wheel.

It has been proposed to yieldingly mount the brake heads upon the beams, depending upon the springs or equivalent resilient means for holding the brake head in the desired adjusted position, but this provision is not adequate, owing to the well known difficulty encountered in the adjustment of the spring tension and of maintaining a uniform locking effect upon the brake head in continued service.

It is the purpose of my present invention to provide a brake head which may be locked with sufficient rigidity to secure its proper application to the wheel in due relation to the wheel tread and which in improper adjustment or abnormal position, due to the loading of the car, will automatically adjust itself to a new and unusual position and thereby avoid danger of breakage and at the same time present the brake shoe properly to the tread of the wheel.

My present improvement is embodied in an adjustable brake head which is similar in general form to that described in my application Serial Number 440,975, filed June 29, 1908, but differs therefrom in that in my present improvement the brake head, while suitably locked to maintain it at all times in proper braking relation to the car wheels under normal conditions, is so constructed that it will adjust itself under abnormal conditions.

In the accompanying drawings,—Figure 1 is a substantially central vertical section through the brake head and sleeve forming a part of the brake beam. Fig. 2 is a section on line 2—2 of Fig. 1 as viewed in the direction indicated by the arrow. Fig. 3 is a top plan view of the brake beam sleeve. Figs. 4 and 5 are fragmentary sections illustrating the manner of positioning the locking block and wedge in the pocket or recess of the brake head, and Fig. 6 is an enlarged section of the locking teeth of the sleeve and locking block respectively.

To the brake beam, which is composed of the compression member 10 and the tension rod 11 suitably held together in a manner which need not be described, is applied the sleeve 12 shown in Fig. 3, said sleeve having an integral flange 13 which forms an abutment for the inner face of the brake head. The said sleeve is cut away upon its periphery leaving, however, a bearing segment $12^a$ extending longitudinally of the sleeve and bearing flanges $13^a$—14 extending circumferentially of the sleeve. The depressed portion of said sleeve is provided with fixed teeth or serrations 15 which may be parallel to each other and at right angles to the axis of the sleeve. The bearing member 14 is also cut away at two points $14^a$—$14^b$.

The brake head 16 may be of any preferred construction of the adjustable type and, as shown, is provided with a cylindrical hub 17 which is adapted to fit closely over the sleeve. The hub has upon its interior an integral key 18 which is of a length adapted to pass through one of the openings $14^a$ or $14^b$ in applying the brake head to the beam and to serve to lock the head upon the sleeve laterally. In the lower portion of the body of the head and radially to the sleeve there is formed a chamber 19 to receive the two-part locking device consisting of the threaded wedge 20 and the tightening wedge 21, which latter is operated by means of a T-headed bolt 22. The teeth $20^a$ of the block 20 are formed to intermesh with the teeth 15 of the sleeve and by manipulating the wedge the engagement may be so made as to frictionally hold the brake head in any adjusted position under ordinary conditions of service. It is obvious, however, that in abnormal conditions, as for example where the relation of the brake head to the flange of the wheel is such that the brake shoe would contact with the wheel only at a single point, upon the application of the brake the shoe and head will turn around the beam until the former comes into full bearing upon the tread of the wheel, the strain overcoming the frictional hold between the enmeshing teeth of the locking block and the sleeve, thus avoiding any liability of breaking any of the parts or injuring the tread of the wheel.

It will be obvious from the foregoing that the chief advantage in my present improvement consists in the employment of a locking means which will serve the purpose of holding the brake head and the shoe carried thereby in any desired adjusted position and which will yield and automatically adjust itself under abnormal conditions. This yielding has no destructive and but little wearing effect upon the locking means since the holding is effected by friction, the degree of which is proportionate to the pressure exerted by the wedges. Of course, it is possible to set up the wedges so tight as to produce friction to such an extent as to lock the brake head rigidly in position, but since the principal requirement is to maintain the brake shoe in a position approximately concentric to the wheel when out of contact, by suitably adjusting the wedges this normal position may be maintained and at the same time the brake head be left free to adjust itself automatically under abnormal conditions.

I claim:

1. In a device of the character described, the combination with the brake beam, of a brake head adapted to fit over the end of said beam, and a locking means comprising locking teeth or serrations on the brake beam or part carried thereby and a locking block having teeth adapted to intermesh with the teeth of the brake beam, said teeth being arranged at right angles to the axis of the brake head and unyielding means for adjusting the locking block whereby the head may be fixed in any adjusted position and permitted to rotate on the beam substantially as described.

2. The combination with the brake beam having locking teeth or serrations extending parallel to each other and circumferentially thereof, of a brake head having a movable locking block provided with teeth adapted to enmesh with the teeth of the brake beam, and unyielding means for adjusting the locking block whereby the brake head may be fixed in an adjusted position substantially as described.

3. The combination of a brake beam having a sleeve thereon provided with circumferential bearings and peripheral locking teeth arranged between said bearings and at right angles to the axis of the sleeve, of a brake head having a movable locking block provided with teeth adapted to engage the teeth of the sleeve and wedge means for moving said block whereby to hold the brake head in adjusted position, substantially as described.

4. The combination with a brake beam of a sleeve adapted to fit over the end of said beam, said sleeve having a peripheral bearing flange interrupted at one or more points, of a brake head having a cylindrical hub with an inwardly projecting key adapted to pass through said opening or interrupted portion of the sleeve flange and said sleeve being provided with circumferential teeth or serrations, and a locking block having teeth or serrations adapted to engage the teeth of the sleeve and means for moving said block to cause such engagement, substantially as described.

WILLIAM E. FOWLER, Jr.

Witnesses:
FREDERICK C. GOODWIN,
WALTER M. FULLER.